United States Patent Office 2,712,007
Patented June 28, 1955

2,712,007

FRACTIONATION OF DEXTRAN PRODUCTS

Ivan A. Wolff, Russell L. Mellies, and Carl E. Rist, Peoria, Ill., assignors to the United States of America as represented by the Secretary of Agriculture No Drawing. Application August 27, 1952,
Serial No. 306,746

3 Claims. (Cl. 260—209)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the separation and recovery of a dextran fraction of predetermined molecular weight range from a crude dextran mixture consisting mainly of products of varying molecular weight, especially of dextran cleavage products. More particularly it relates to an improved method for fractionating such dextran material by precipitation with aqueous methanol whereby a larger proportion of dextran of a predetermined molecular weight may be recovered than heretofore.

The hydrolysis or pyrolysis of dextran results in a product having a relatively wide range of molecular weight. For many purposes, particularly those relating to the use of dextran as a blood volume expander, it is necessary to fractionate these products so that undesired materials of high and low molecular weight are separated.

The cleavage processes are usually carried out so as to yield a maximum proportion of products within the desired range, and these processes, for example acid hydrolyses, may then be followed by a series of precipitations designed to separate the unwanted materials. This separation or fractionation has been accomplished in the past with aqueous solutions of precipitants such as ethanol, methanol, or similar substances. The concentration of the precipitant is adjusted so that the desired separation is effected by selective precipitation. For example, to a crude neutralized acid hydrolyzate dissolved in water, sufficient precipitant is added to the solution to render insoluble, and hence precipitate, those constituents having molecular weights in excess of that desired in the final fraction. After separation of the precipitated material, the concentration of the precipitant in the solution is then adjusted to render insoluble those constituents within the desired range of molecular weight, but yet to maintain in solution those constituents possessing molecular weights that are below that desired. The fractionated portion of the desired molecular weight range may be refined or refractionated by a similar series of steps to obtain sharper separations. Refractionation by one or two of these series of steps is necessary in order to obtain the purity and homogeneity of dextran to be used as a blood volume expander, the so-called clinical fraction.

The precipitants previously used have included aqueous ethanol or aqueous methanol. Heretofore, ethanol, although relatively more expensive, has given better results than methanol, particularly in the ultimate recovery of the clinical fraction of dextran. Methanol, although performing as an efficient precipitant in the first series, has rather consistently failed to act satisfactorily in refractionations, and ultimate recoveries of around 25 percent of a total acid hydrolysate are typical, compared with a recovery of 30 percent or higher possible with ethanol.

We have determined that the failure of methanol to afford higher recoveries in refractionations is mainly due to a residual effect of methanol upon the fractionated dextran. This effect is not exhibited by ethanol or other precipitants with which we are familiar. For example, our analyses show that the alcohol content of the precipitated material is of about the same order with either methanol or ethanol, though slightly higher in the case of methanol. This difference in alcohol content in the precipitated materials, a fact which in itself is not readily explained, is not of sufficient order to account for the effect noted with methanol in the refractionating step. This residual effect with methanol is carried over to the refractionations so that when the first crude fraction is dissolved in water for refractionating and the previously determined quantity of methanol added to render insoluble the undesirably high molecular weight constituents, the effect is the same as if that methanol concentration were exceeded, for not only are the high molecular weight constituents rendered insoluble, but also a considerable quantity of constituents within the desired range are precipitated and lost.

Utilizing our discoveries, we have developed a methanol fractionating method which enables recoveries at least equal to the recoveries possible with ethanol. We have found by experiment, for example, that the peculiar residual effect of methanol upon the crude fractionated dextran may be compensated by reducing the quantity used in subsequent refractionations to separate the high molecular weight constituents. Inasmuch as the fractionating effect of methanol, as well as other precipitants, is extremely critical, the reduction in quantity is quite small. Experiment has established that a reduction equivalent to about 1 volume percent of methanol is enough to compensate fully. Actually, the reduction can even be less, say about 0.5 percent, to achieve recovery of a sharply defined fraction. If the reduction exceeds 1 percent, the undesired high molecular weight constituents are not all rendered insoluble, and the final recovered fraction is liable to cover a broader molecular weight range than desired.

The process of this invention is adapted to the isolation of defined molecular weight fractions of dextran cleavage products or of dextran which contain constituents of substantially different molecular weight produced as for example by controlled enzymic synthesis. One particular fraction which may be desired is that of the clinical size molecular weight, but it is to be understood that this invention is not limited thereto. It may be used for the fractionation and recovery of other dextran products of greater or less molecular weight range, the particular range being determined by the concentration range of methanol precipitant and the breadth of the molecular weight range determined grossly by the concentration spread of the precipitant solutions as is known in the art. In any instance, the advantages of this invention are realized by employing methanol solutions of substantial less concentration for reprecipitations compared with those used for the initial precipitations.

According to our discoveries, the residual effect of methanol is greater at the lower end of the concentration spread where the high molecular weight constituents are precipitated. However, the effect is appreciable at the high end where the desired fraction is precipitated.

The following examples illustrate the invention.

*Example 1*

A dextran, produced by the action of *Leuconostoc*

*mesenteroides*, was hydrolyzed with acid in the usual manner. The hydrolysis was carried out so as to produce a maximum of hydrolysate having a molecular weight within the range of 75,000 ± 25,000 average. To this neutralized hydrolyzate dissolved in water, methanol was added to bring the concentration up to 42 volume percent. The precipitated high molecular weight constituents were separated, and more methanol was added to bring the concentration up to 50 volume percent. The precipitated material was the crude desired fraction, representing about 62 percent of the total hydrolyzate. It was redissolved in water, and the process of fractionation repeated exactly as at first. This was followed by a second refractionation, the final desired fraction representing 26.2 percent of the total hydrolyzate, a recovery typical of prior methanol fractionating methods.

The foregoing procedure was repeated except that in both refractionations, the quantity of methanol added was reduced to that equivalent to 41.5 volume percent instead of 42 percent and 49.5 instead of 50 percent. The final desired fraction represented 33.0 percent of the total hydrolyzate, a recovery typical of the best results obtainable with ethanol fractionation methods.

*Example 2*

The procedure of Example 1 was repeated, carrying out the initial precipitation employing precipitant solutions of methanol of 42 percent and 49 percent. Reprecipitations were carried out using precipitant solutions of methanol of 41 percent and 49 percent. The final desired fraction represented 31.8 percent of the total hydrolysate.

In both Examples 1 and 2 the products were well within the desired limits of molecular weight and viscosity.

We claim:

1. A method for fractionating a mixture of dextran material comprising constituents of substantially different molecular weight which comprises dissolving a mixture of such material in water, adding methanol to bring the methanol concentration of the solution to a first predetermined value to render insoluble and precipitate high molecular weight constituents of the mixture, separating the precipitated high molecular weight constituents, adding more methanol to increase the concentration to a second predetermined value to render insoluble and precipitate an intermediate molecular weight fraction, separating the intermediate molecular weight fraction, said intermediate molecular weight fraction nonetheless containing relatively high molecular weight constituents, subjecting said intermediate molecular weight fraction to a further fractionation comprising redissolving same in water and adding methanol in amount equivalent to bring the concentration of methanol to substantially less but not more than 1 volume percent less than the first predetermined value to render insoluble and precipitate relatively high molecular weight constituents, separating said precipitated constituents, adding more methanol in amount equivalent to bring the concentration of methanol to the second predetermined value to precipitate a refractionated intermediate molecular weight fraction and separating the intermediate molecular weight fraction from the solution.

2. The method of claim 1 in which the mixture of dextran material comprises dextran partially hydrolyzed by acid.

3. In a process for the treatment of a mixture of dextran cleavage products to obtain a fraction thereof of increased homogeneity and reduced polydispersity which comprises fractional precipitation from aqueous solution by adding methanol and which includes a first fractionation followed by at least one succeeding fractionation, each fractionation comprising the addition of methanol to a first predetermined concentration calculated to render insoluble and precipitate constituents of relatively high molecular weight, separating said precipitated constituents and then adding methanol to a second predetermined concentration to render insoluble and precipitate desired constituents to the exclusion of constituents of relatively low molecular weight, and separating said precipitated desired constituents, the improvement comprising carrying out said succeeding fractionations using in at least one of the precipitating steps thereof, methanol concentrations substantially less, but not more than 1 volume percent less than the corresponding predetermined concentration used in said first fractionation.

References Cited in the file of this patent

UNITED STATES PATENTS

| 2,565,507 | Lockwood et al. | Aug. 28, 1951 |
| 2,623,001 | Sylven et al. | Dec. 23, 1952 |

FOREIGN PATENTS

| 673,103 | Great Britain | June 4, 1952 |